(12) United States Patent
Hartman et al.

(10) Patent No.: US 10,128,753 B2
(45) Date of Patent: Nov. 13, 2018

(54) INDUCTOR CURRENT EMULATOR

(71) Applicant: Rohm Powervation Limited, Blackrock, County Cork (IE)

(72) Inventors: Mark Hartman, Santa Clara, CA (US); Botao Miao, Sunnyvale, CA (US)

(73) Assignee: Rohm Powervation Limited, Blackrock, Cork (IE)

( * ) Notice: Subject to any disclaimer, the term of this patent is extended or adjusted under 35 U.S.C. 154(b) by 0 days.

(21) Appl. No.: 15/847,731

(22) Filed: Dec. 19, 2017

(65) Prior Publication Data

US 2018/0175733 A1  Jun. 21, 2018

Related U.S. Application Data

(60) Provisional application No. 62/436,155, filed on Dec. 19, 2016.

(51) Int. Cl.
*H02M 3/157* (2006.01)
*H02M 3/156* (2006.01)

(52) U.S. Cl.
CPC ........... *H02M 3/157* (2013.01); *H02M 3/156* (2013.01)

(58) Field of Classification Search
CPC ......... H02M 3/156; H02M 2003/1552; H02M 3/155; H02M 3/145; H02M 3/158; H02M 3/1582; H02M 3/157; H02M 3/1563
USPC ................... 323/222, 271, 282–285
See application file for complete search history.

(56) References Cited

U.S. PATENT DOCUMENTS

| | | | | |
|---|---|---|---|---|
| 2013/0249508 | A1* | 9/2013 | Rahimi | G05F 1/625 323/271 |
| 2016/0036326 | A1* | 2/2016 | Sreenivas | H02M 3/158 323/271 |
| 2016/0164416 | A1* | 6/2016 | Li | H02M 3/158 323/282 |

* cited by examiner

*Primary Examiner* — Nguyen Tran
(74) *Attorney, Agent, or Firm* — Hickman Palermo Becker Bingham LLP; Edward A. Becker

(57) ABSTRACT

The present application relates to controllers using current mode control to control the operation of switching power supplies such as DC-DC converters. The application provides an inductor current.

23 Claims, 18 Drawing Sheets

INDUCTOR CURRENT EMULATOR

RELATED APPLICATIONS

This application claims the benefit of U.S. provisional patent application 62/436,155, filed Jun. 19, 2016 and entitled "An Inductor Current Emulator," the entirety of the disclosure of which is incorporated herein for all purposes.

FIELD OF THE APPLICATION

The present application relates to switching power supplies and in particular to a controller for a switching power supply and a method of emulating inductor current in such controllers.

BACKGROUND OF THE APPLICATION

The general purpose of a controller in a power supply is to try and ensure that the output voltage of the power supply follows a reference value.

A conventional arrangement employing such a controller is shown generally in FIG. 1.

In the arrangement shown, the power supply circuit has a switching circuit 10 which provides a regulated output voltage $V_{OUT}$ to a load 8 from an input voltage $V_{IN}$. As would be familiar to those skilled in the art, the switching circuit, also referred to as the power stage, employs one or more switching devices configured in combination with one or more storage elements (e.g. inductors and capacitors) to convert an input voltage to an output voltage. The switching elements and storage elements are arranged together in a switching topology. Examples of switching topologies include, for example but are not limited to, Buck, Boost and Flyback.

A controller 6 is employed to control the operation of the switching circuit 10. Generally, the controller supervises the switching operation to regulate the output voltage. Internally, the controller employs a feedback loop that compares the actual output voltage $V_{OUT}$ with a desired output $V_{REF}$ to derive an error voltage $V_{err}$ which is used by the controller to generate switching signals for the switching circuit. These switching signals are conventionally pulse width modulation (PWM) signals although other modulation schemes are known.

There are two main approaches to operating a controller which are referred to respectively as voltage-mode control and current-mode control.

Voltage-mode control is the traditional approach employed. In Voltage-mode control, a feedback loop is provided by feeding the error voltage $V_{err}$ to a compensator, which for example may be a proportional, integral, derivative (PID) compensator which in turn provides a compensator output which is used directly to generate the PWM signal, i.e. the duty cycle of the PWM signal is proportional to the compensator output. Generally, the compensator output is compared with a generated ramp signal in a comparator to generate the PWM signal.

Voltage mode control suffers from a number of disadvantages including, for example, slow response to line and load variations. In particular, any change in load is only detected by a change in output voltage and then corrected by the feedback loop. The output filter of the feedback loop adds two poles to the control loop requiring a Type III compensation. This usually means relative slow response.

Current-mode control was developed in the 1980's to address the disadvantages of voltage mode control.

Current-mode control operates by introducing a second feedback loop which feeds back a measurement of the inductor current. The fed back measurement of inductor current is provided as one input to a comparator used to generate the PWM signal with the error voltage providing the other input. Thus in simple terms, the fed back measurement of inductor current effectively replaces the generated ramp signal in voltage mode control.

Current-mode control addresses a number of disadvantages of voltage-mode control including, for example, that there is typically just one pole as opposed to two in voltage mode, that Type II compensator may be employed and the power stage dynamics do not change in discontinuous mode conditions, inherent Vin Feedforward and accurate current sharing. It directly controls the output current rather than voltage, and the power stage is only a single pole to the feedback loop. This allows simpler and higher bandwidth compensation (one pole and Type II) over a comparable voltage mode circuit.

The present application is directed at the mechanism by which the measurement of inductor current is provided in a current-mode controller

SUMMARY

Accordingly, a first aspect of the present application provides an inductor current emulator circuit for use in a current mode controller employing pulse width modulation to control a switching power supply to provide an output voltage and an output current from an input voltage. The inductor current emulator comprises:
a comparator having a first input for receiving a sensed inductor current value and a second input, the comparator providing an output representing the difference between the first and second inputs; an analog to digital converter for converting the output of the comparator to a digital signal; a digital compensator responsive to the digital signal to provide a compensated digital signal representative of a DC component of inductor current; and an analog emulator receiving the compensated digital signal representative of the DC component of inductor current and providing an emulated value of current to the second input of the comparator. The analog to digital converter is suitably a Sigma/Delta analog to digital converter. The analog emulator suitably comprises an AC emulator circuit configured to generate an emulated AC component of inductor current. The analog emulator may be configured to add the emulated AC component of inductor current to the DC component of inductor current to provide the emulated value of current to the second input of the comparator. The analog emulator may comprise a first Digital to Analog converter (DAC3) for converting the digital signal representative of the DC component to an equivalent analog value which is added to the emulated AC component of inductor current to provide the emulated value of current to the second input of the comparator. The AC emulator circuit may comprise a capacitor for storing the instantaneous value of the AC component of inductor current. The AC emulator circuit suitably comprises a second DAC (DAC1) providing a current to charge the capacitor during the ON time of a PWM switching cycle. The second DAC suitably converts a digital signal representative of the difference between VIN and VOUT for the switching converter divided by a value representative of the inductance of the inductor. The AC emulator circuit may further comprise a third DAC (DAC2) providing a current to discharge the capacitor during the OFF time of a PWM switching cycle. The third DAC suitably converts a digital signal representative of VOUT for the switching converter divided by a value representative of the inductance of the inductor. A reset circuit may be provided for resetting the capacitor at the start of PWM switching cycles of the converter. A digital emulator may be provided to operate in parallel with the analog emulator to provide a digital emulated inductor current, wherein the AC component of the digital emulator at the time the reset circuit resets the capacitor is fed forward from the digital emulator to modify the digital signal representative of the DC component of inductor current. This digital emulator operating in parallel with the analog emulator suitably thus provides a digital emulated inductor current. An inductance adjusting loop may be provided for adjusting an inductance value employed by the inductor current emulator. The inductance adjusting loop is suitably responsive to the output from the analog to digital converter. The inductor emulator is suitable for use in a controller employed for controlling a switching circuit of a power supply. The power supply is suitably a DC-DC converter, for example a buck converter or a boost converter or other suitable switching topology. The controller may be implemented in an integrated circuit.

In a second aspect, a circuit is provided for adjusting a value of inductance of an inductor employed in a switching circuit controller, the circuit comprising:

a first circuit providing a sensed current waveform of current in the inductor;

a second circuit providing an emulated current waveform of current in the inductor, wherein the second circuit employs the inductance value in providing the emulated current waveform and wherein the circuit is responsive to an error value representative of the difference between the waveforms of the first and second waveforms to adjust the inductance value to minimize the error value.

These and other aspects of the application will become apparent from the detailed description which follows.

DESCRIPTION OF DRAWINGS

The present application will now be described with respect to the drawings, in which.

DETAILED DESCRIPTION

Figure 1:
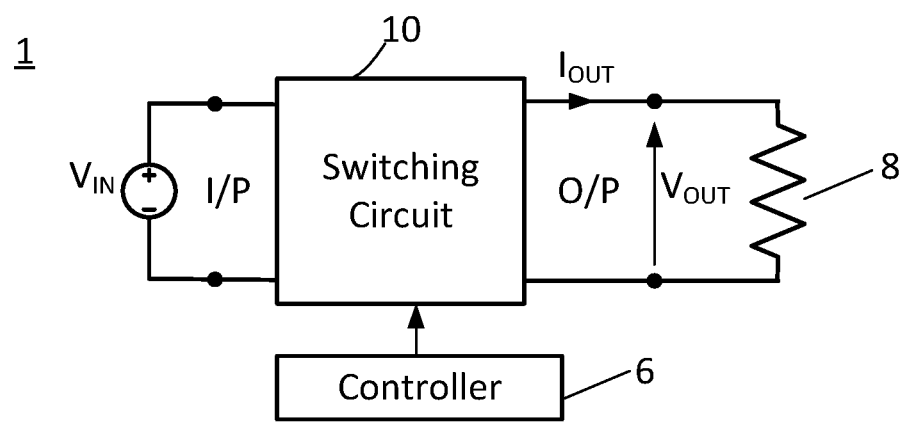
FIG. 1 is an example of a known control arrangement for a power supply.

As explained above, current mode controlled switching power supplies offer several advantages over voltage mode switching power supplies. These advantages include that current mode exhibits fast dynamic response to the load transients and line transients. Additionally, current mode offers higher reliability with fast, cycle-by-cycle current sensing for output short circuit and overload protection. In contrast, voltage mode controlled power supplies are slower to react to an over current condition which can result in a failure in some applications. Current mode control also allows for simple and reliable feedback loop compensation ensuring the controlled power supply is stable with all ceramic output capacitors making for a smaller solution size. Also, the use of current mode control makes accurate current sharing in high current multiphase designs easier.

The present application provides a control arrangement with an improved inductor current emulator which provides digitized inductor current ($I_L$) information using values for the input voltage ($V_{IN}$), output voltage ($V_O$) and PWM duty cycle.

Compared to the conventional method with a high speed and high resolution ADC, the proposed solution uses an analog subtraction, a sigma/Delta ADC, a digital compensator and two DACs. These are simple analog blocks and digital functions, which will significantly reduce the power consumption and silicon area with a limited design effort.

Before discussing the approach of the present application, an exemplary known approach will be described with reference to the prior art circuit 20 of FIG. 2. The circuit employs a sense circuit 22 to sense the inductor current to provide a sensed inductor current. The sensed inductor current $I_{sense}$ is provided to an analog front end, AFE 24. The AFE is generally designed to be able to receive a signal from a variety of external $I_L$ sensing gains, and a variety of common mode offsets. The purpose of the AFE is to condition $I_{sense}$ prior to conversion to a digital form. Thus in the exemplary arrangement shown, the AFE comprises a programmable gain amplifier (PGA) 28 which amplifies the sensed current provided by the sense circuit. An offset circuit 30 and sample and hold circuit 32 follow and provide a signal suitable for conversion.

The conversion to digital form is performed by an ADC 34, which follows the analog front end and converts the sensed inductor current to a digital equivalent signal for use by a subsequent digital processing section which produces a synthesized inductor current.

Typically, the inductor sensing circuit is an RC type circuit with matching L*DCR time constant, or an active inductor current sense circuit provided from a driver MOSFET IC in which the switching devices of the switching circuit are implemented in combination with driver circuitry.

It will be appreciated that the different approaches will have different characteristics, thus the required equivalent current sense gain can range, for example, from 0.1 mΩ for a DCR sense approach to 10 mΩ in an active circuit sense. To accommodate both approaches and indeed others, the AFE includes the PGA 28 to scale the signal provided into the $I_{sense}$ ADC full scale range. Additionally, the $I_{sense}$ subsystem needs to measure positive and negative currents, so the AFE needs to offset the zero current point to some reference mid-range, which is performed by the offset circuit 30. The resulting modified $I_{sense}$ value is sampled, typically during the off time of the inductor. Several samples may be taken and averaged to reduce noise. The sample waveform, $I_{L(SnH)}$, is only one point of the continuous inductor current $I_L$ waveform.

To obtain, a real time emulation of the $I_L$ waveform, an $I_L$ Synthesizer block synthesizes the continuous $I_L$ waveform by estimating the on and off slope of $I_L$ and combining that with the digitized $I_{L(SnH)}$, i.e. the DC value of current is measured and the AC ripple is synthesized and superimposed. Conceptually, the AC ripple is estimated based on the measurements on $V_{in}$, $V_{out}$, PWM on/off time, and a value for inductance, which may be pre-programmed or otherwise provided by user. The synthesized $I_L$ waveform may then be used by the current mode controller to generate an appropriate PWM switching signal to control the switching circuit.

A first aspect of the present application will now be explained with reference to the arrangement of FIG. 3 which generally provides the same basic function as the arrangement of FIG. 2, i.e. it uses an inductor current synthesizer circuit 126 to provide a synthesized inductor current. More specifically, the inductor current synthesizer circuit provides two inductor current emulators 136, 138 which operate in tandem and provide separate emulator inductor currents. The first 136 is an analog inductor current emulator comprising an analog circuit for emulating the current in the inductor of the switching circuit and providing an emulated analog output of inductor current. The second 138 is a digital inductor current emulator comprising a digital circuit for emulating the current in the inductor of the switching circuit and providing an emulated digital output of inductor current. These will now be explained in greater detail.

The approach uses an inductor ($I_L$) emulator to get the inductor current information. As with the method of FIG. 2, it uses an appropriate method to sense the inductor current, e.g. through a SenseFET or DCR circuit 122.

Figure 2:
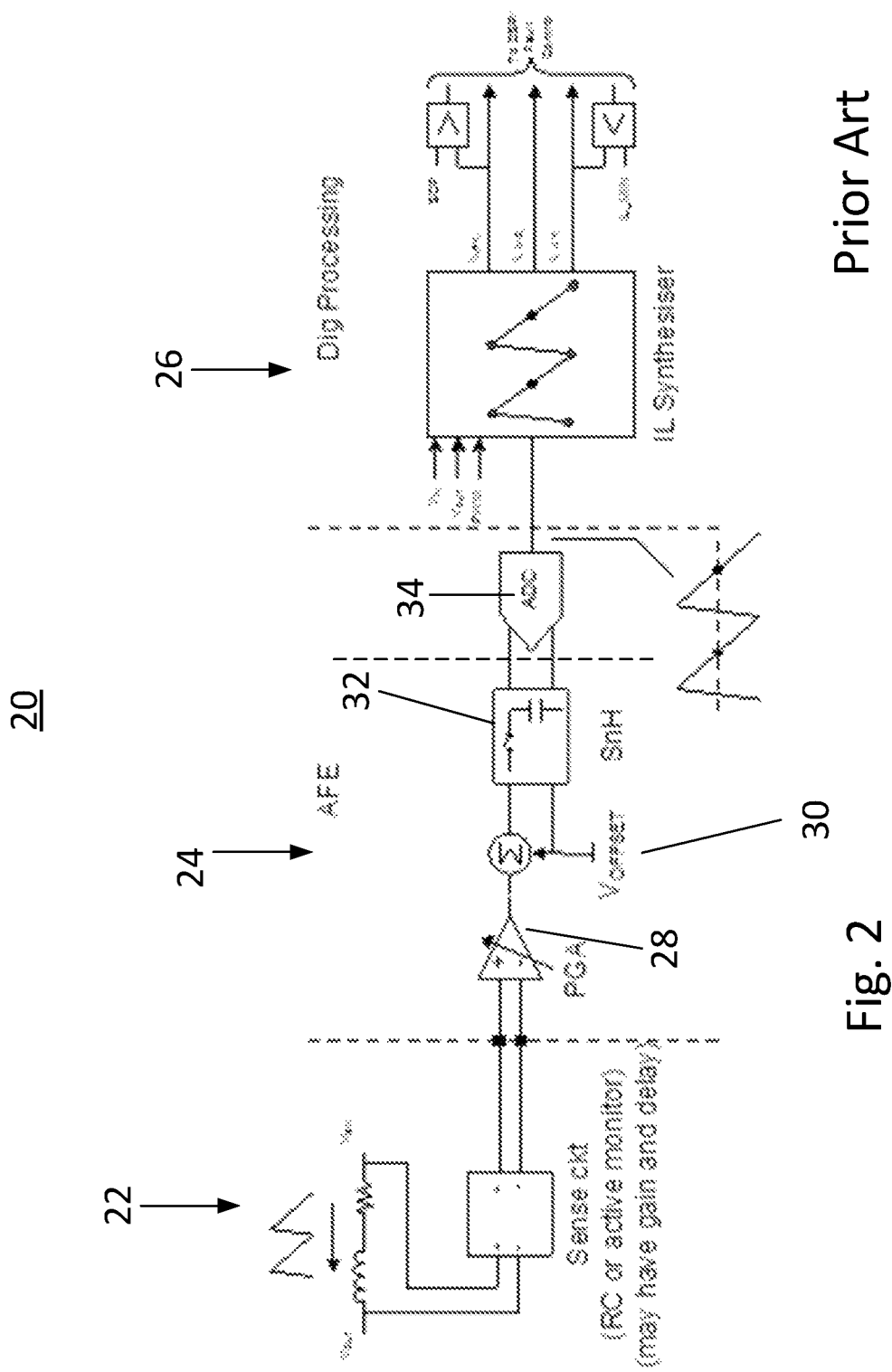
FIG. 2 is an example of a technique known in the art for generating an inductor current for use in a control arrangement such as that shown in FIG. 1.

As with FIG. 2, an analog front end (AFE) 124 may be provided to provide amplification and signal conditioning, for example an AFE may amplify the differential signal and remove a high common mode voltage.

The current emulator circuit 126 follows the AFE, in which a comparator 130 compares the amplified signal from the AFE with an output of an $I_L$ emulator. Alternatively stated, the comparator subtracts the current estimate of inductor current from the emulator from the current sensed current to provide an error measurement representing the difference between the sensed inductor current and an emulated inductor current.

This error is then sampled by an ADC 132 to provide a digital version of the error signal. The ADC may suitably be a sigma/delta type ADC. The digital version of the error signal is provided to a digital compensator 134 which is designed to provide/adjust the DC component of a following analog IL emulator 136.

The analog $I_L$ emulator employs the DC component from the digital compensator and information regarding $V_{IN}$, $V_O$ and PWM to provide an emulated inductor current which is provided as an input to the comparator 130, effectively forming a closed feedback loop. It will be appreciated that in such a closed feedback loop, the average IL emulator output will be forced to equal to the average inductor current.

Whilst, the emulator may be implemented digitally, its output would need to be converted to analog format with a conventional high speed DAC, which would consume high power. Accordingly, It is advantageous to implement the first emulator 136 in mixed-signal circuitry to reduce power and area. This includes custom analog circuitry to generate ViL in analog format, while a digital replica of ViL is generated in parallel in a digital IL emulator 138 to provide a high resolution and high speed digitized version of the inductor current which may be used for protection, telemetry, and control.

Figure 5:
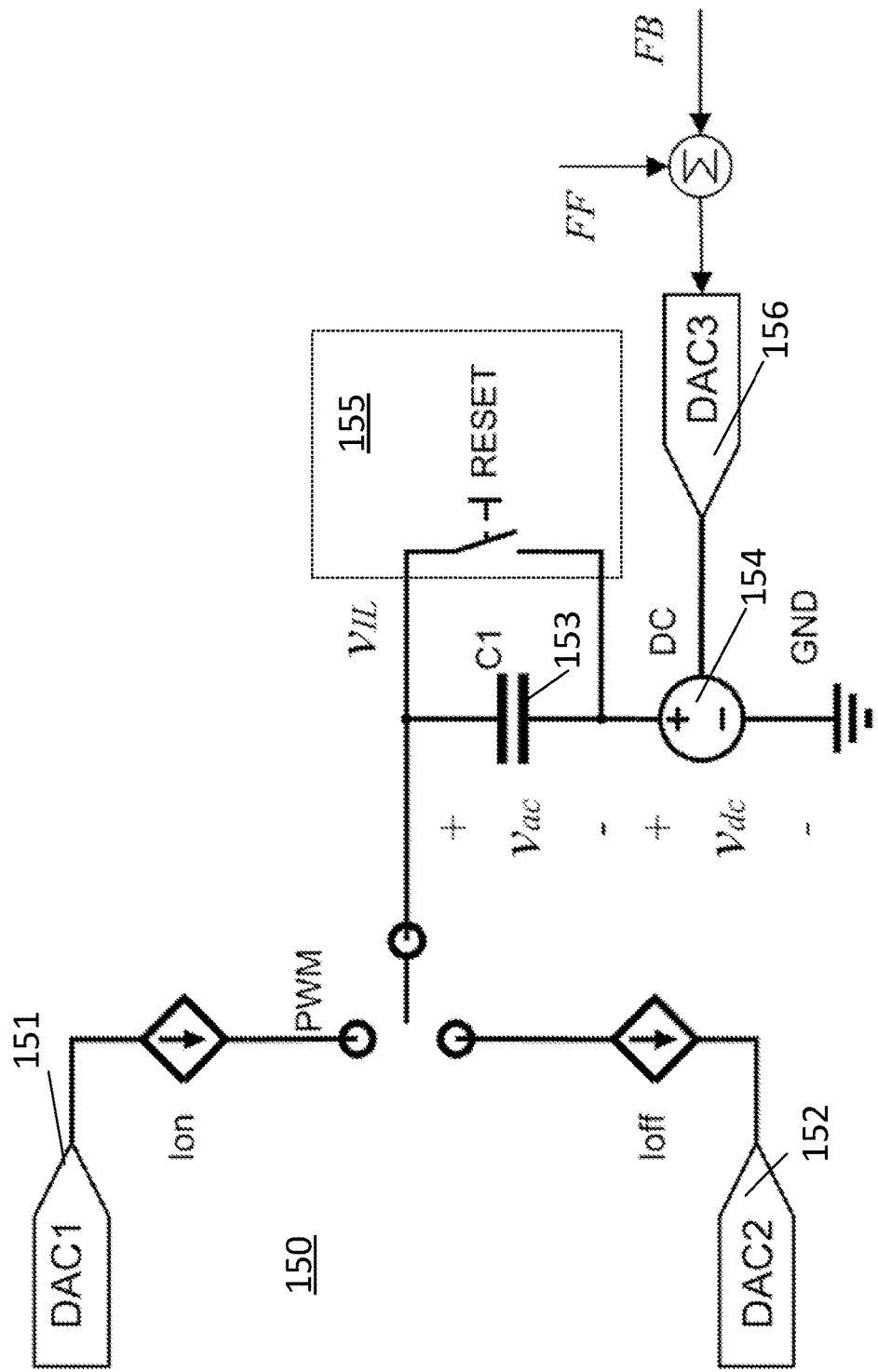
FIG. 5 is an exemplary inductor current emulator according to a first aspect of the present application providing an analog form of emulated inductor current.

The mode of operation of an analog form, as shown in FIG. 5, of the emulator will now be explained in the context where the switching circuit is a buck converter, the operation of which will be familiar to those skilled in the art.

Figure 4:
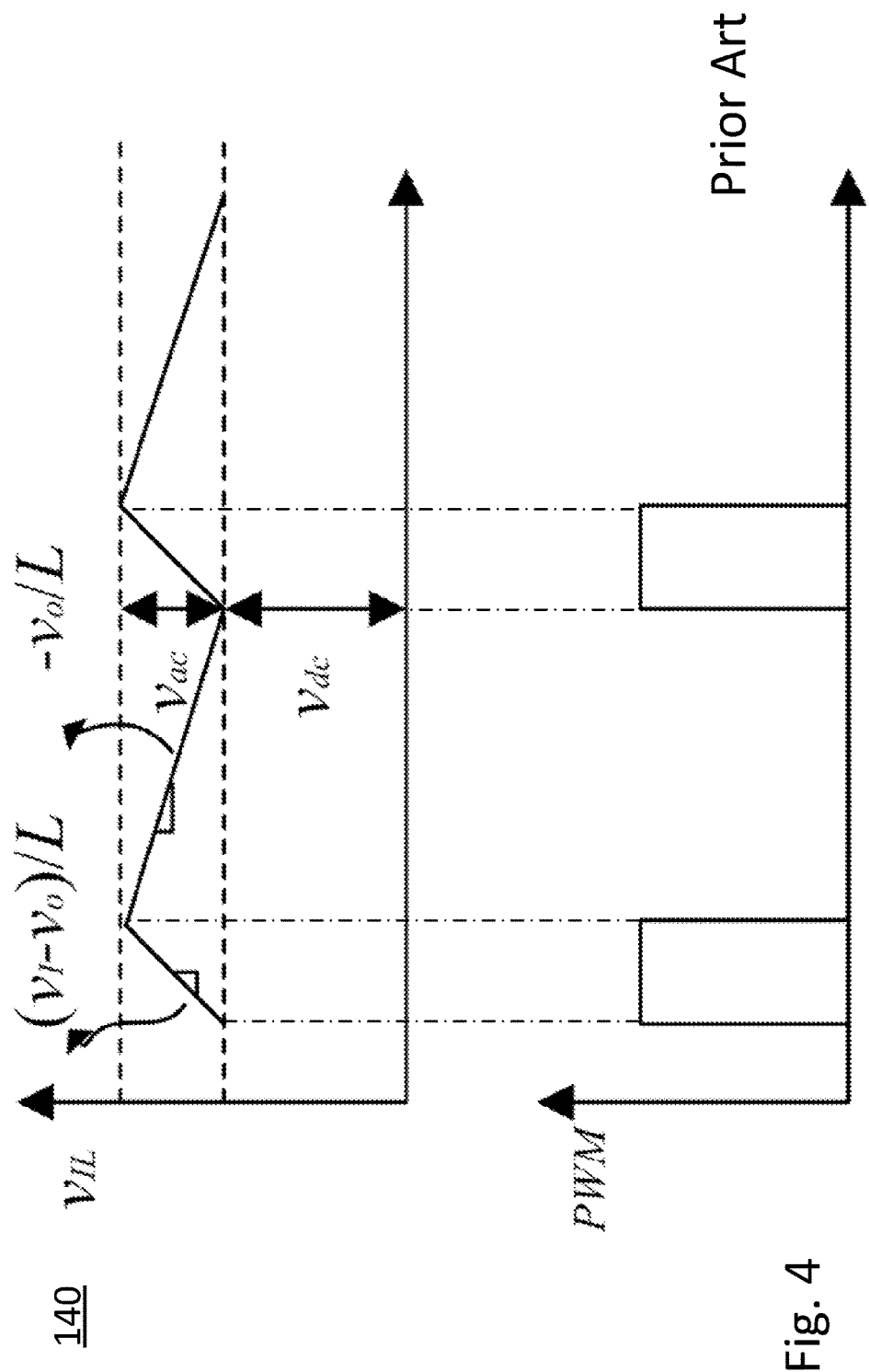
FIG. 4 represents a waveform for a typical inductor current in a buck converter.

The inductor current waveforms 140 of a buck converter operating in continuous conduction mode (CCM) are shown in FIG. 4 with the associated PWM signals. It will be appreciated by those skilled in the art, that the inductor current is a generally triangular waveform in CCM mode in a buck converter. When the PWM switching signal is switched high (ON), the voltage applied to the inductor is $V_{IN}-V_O$. When the PWM switching signal is switched low (OFF), the voltage is $-V_O$. It will be appreciated that the voltage changes linearly between these points. It will be appreciated (in CCM mode) that the inductor current follows the changes in voltage, i.e. the (AC component) change in inductor current di/dt corresponds to the inductor voltage divided by the inductance, i.e. V=L di/dt.

These waveforms will now be discussed in the context of the circuit of the inductor current emulator in FIG. 5.

The total voltage $V_{IL}$ consists of an AC voltage developed across a capacitor 153 (C1) and a DC voltage source 154 at the capacitor negative terminal. The combination of the AC+DC voltages generally emulates the inductor current.

The current emulator comprises an AC emulator and a DC emulator. The AC value may be provided by a current DAC which provides charge to and from the capacitor corresponding to the changes to inductor current during ON and OFF periods of the switching cycle.

It will be appreciated that providing two separate current DACs is convenient, with the first current DAC 151 charging the capacitor during the ON time and a second current DAC 152 discharging the capacitor during the OFF time.

Thus an AC emulator circuit is provided by the two current DACs 151, 152 and a capacitor 153 which combine together to generate the AC portion of the emulated current. When PWM is high, a positive current generated by a current DAC (DAC1) charges the capacitor. When the PWM is low, a negative current generated by a current DAC (DAC2) discharges the cap. The positive current is proportional to $k*(V_{IN}-V_O)$, while the negative current is proportional to $k*(V_O)$, where k is proportional to L/C1. Therefore, the cap voltage ($v_{ac}$) is a triangular waveform which emulates the AC component of the inductor current.

To prevent small errors from causing the capacitor voltage to drift, which might eventually saturate the circuit, a reset circuit 155 may be provided. The reset circuit comprises a switch operably connected in parallel with the capacitor which discharges the capacitor C1. This reset circuit resets $v_{ac}$ every cycle. Thus the reset circuit ensures that the initial value of $v_{ac}$ is zero for every switching period.

When the reset circuit is employed, the voltage that is lost by the reset circuit resetting the capacitor is observed in the digital replica as $V_{ff}[n]$, and effectively added back in to the DC component of the analog emulator as analog signal FF and in the digital replica. This recycling of the reset voltage is a feedforward path, which is operated in the digital replica without any ADC.

More specifically, the voltage in the capacitor C1 is recycled to a third DAC, namely DC voltage DAC 156 such that the total $V_{IL}$ voltage is continuous and accurately tracks the total inductor current.

The DC voltage ($v_{dc}$), which is generated by the voltage DAC (DAC3), emulates the DC component of the inductor current. The input of the DAC3 is the summation of the output of the digital compensator in the feedback loop $V_{FB}$ and the increment (reset) $V_{ff}[n]$ of the $V_{ac}$ in one switching period in the feed forward path. The total voltage $V_{IL}$ is the summation of $V_{dc}$ and $V_{ac}$.

The operation of the circuit will now be described in greater detail.

Figure 6:
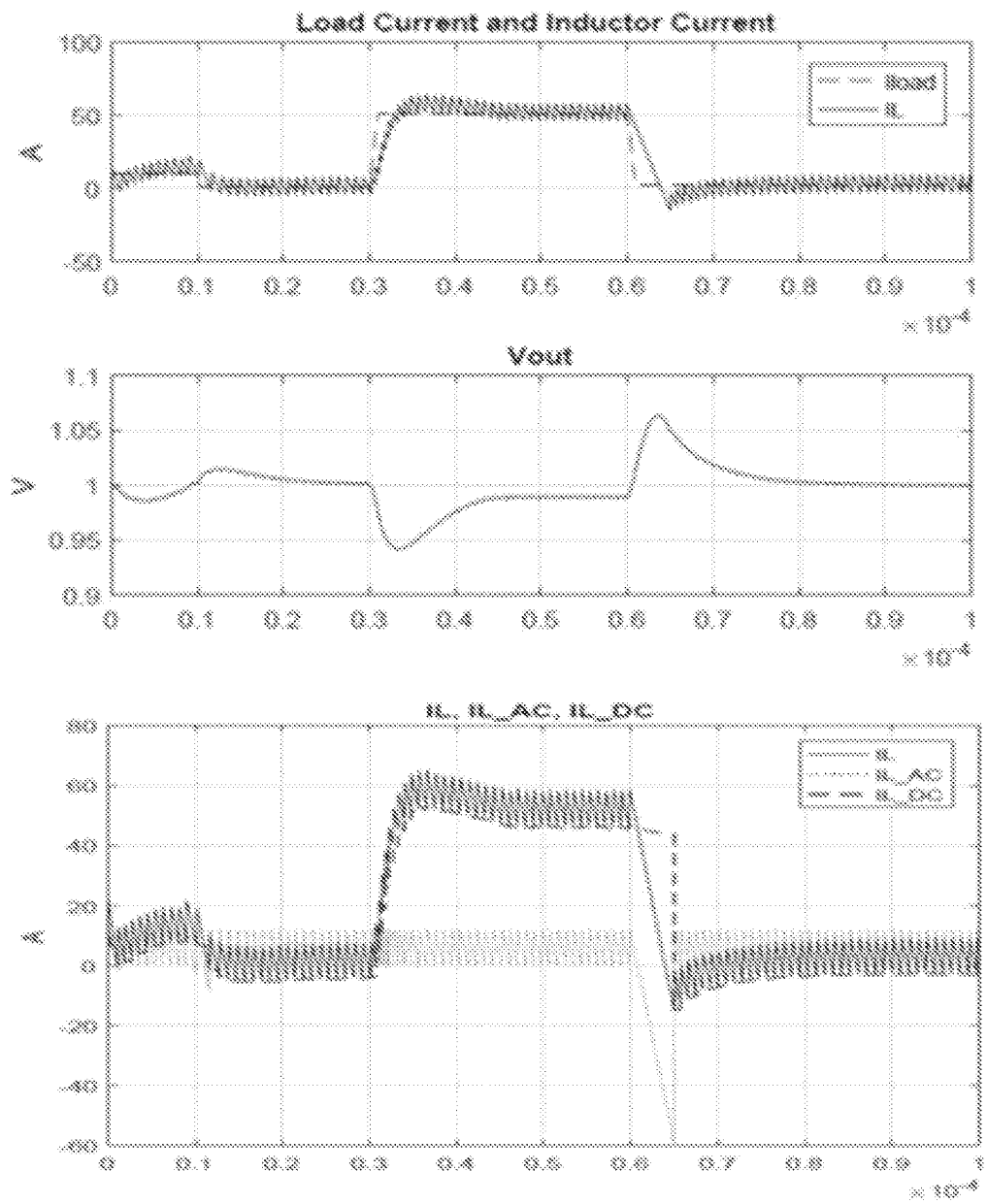
FIG. 6 illustrates load transient waveform of the load current, the inductor current, the output voltage, the emulator voltage with its AC component and DC components for the circuit of FIG. 5.

During the steady state operation, the inductor is governed by the volt-second balance. Its current ramps up during the PWM on time, and ramps down during the PWM off time. The regulator control loop ensures that inductor volt-second balance is met in steady state, therefore, the inductor current starts and ends each period at the same current as shown in FIG. 4. However, during load transients, the regulator control loop commands a net increase or decrease volt-second value until the transient is served, as shown in FIG. 6. To match this operation in the proposed emulator, the net increment adds to the DC component $V_{DC}$ at the end of each period, while the cap voltage $v_{ac}$ resets every period. Thus the total voltage $V_{IL}$ keeps tracking the inductor current. FIG. 6 shows the load transient waveform of the load current, the inductor current, the emulator voltage and its ac component and dc component. It demonstrates good static and dynamic performance of the proposed emulator.

In reality, it will be appreciated that there may be some non-idealities in the system. Firstly, when the emulator circuit starts, the inductor current may not be zero. The initial DC information cannot be found in the PWM, $V_{IN}$ and $V_O$.

Secondly, the DCR voltage drop in the inductor is not considered. It will cause the inductor current to drift gradually, especially when the current is large. Third, the voltage value ($V_{IN}$ and $V_O$) used in the emulator may not be accurate. The I*R drop in the switches and diodes will have subtle but consistent impact on the inductor current. Also, the PWM signal used in the emulator may have some discrepancy to the switch node due to driver delay and dead time.

Whilst, it is well known that all these non-idealities have small effects on the emulated current, the feedback circuit embedded in the $I_L$ emulator is designed to adjust the DC component of the emulated current in the presence of these non-idealities.

The bandwidth of the feedback loop is suitably selected to compensate the effect of these non-idealities continuously. As these effects are small for high efficiency buck power stages, the bandwidth of the feedback loop is chosen to be approximately 1/10 of the switching frequency. While the input of the feedback loop is the difference between the sensed inductor current and the emulated one, its range is small and a relatively high resolution is required for the corrections made by the feedback loop, so the over sampling sigma-delta ADC is a good candidate.

Figure 7:
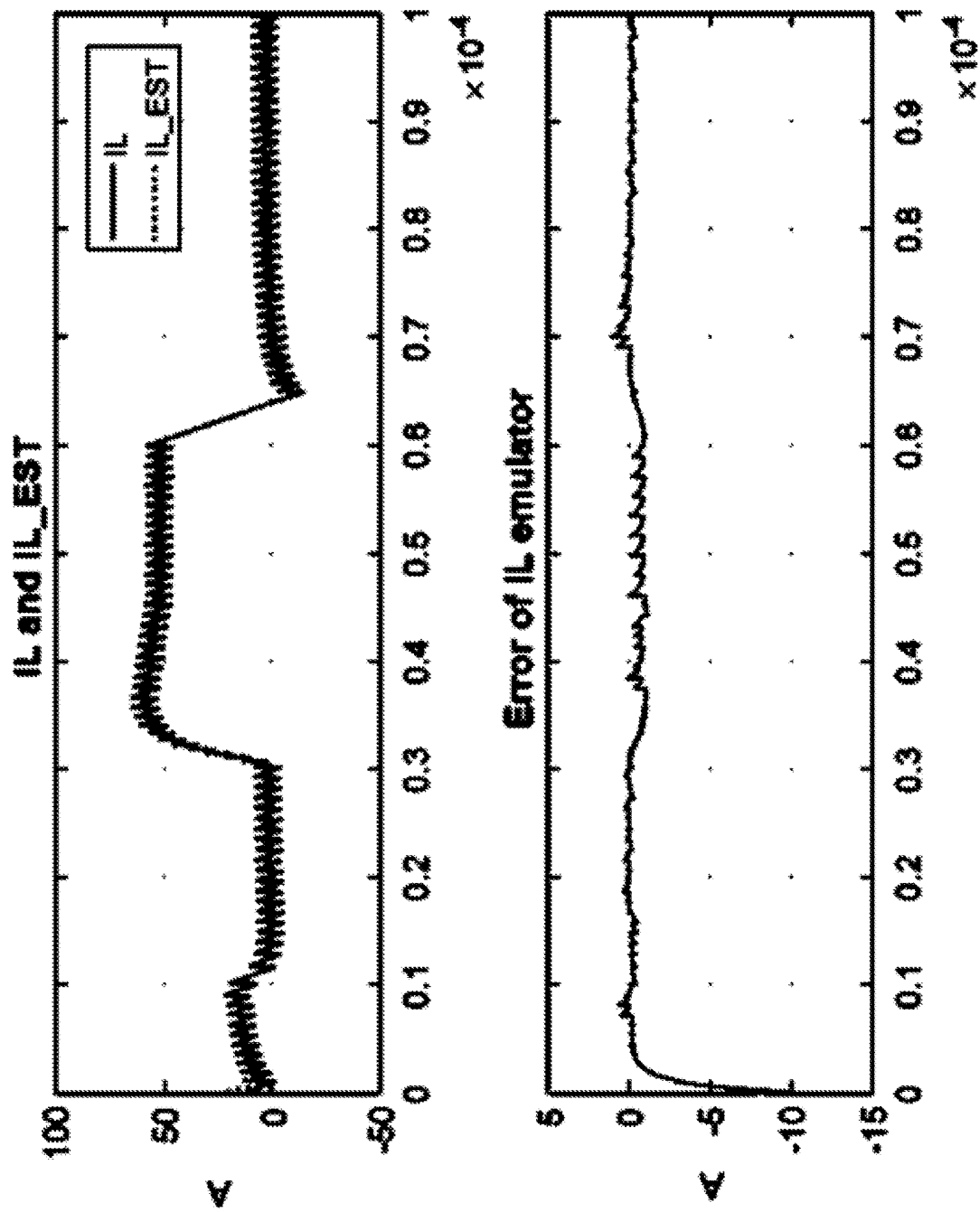
FIG. 7 illustrates the results for an emulator circuit with real and estimated inductor current from the emulator in closed loop with initial error of 10 A and DCR of 1.5 mΩ.

The need for error correction may be demonstrated by simulation, for example in FIG. 7, the results of introducing an initial offset of 10 A, and a DCR of 1.5 mΩ is included to the inductor model to represent offset and I*R drop error and in which it may be seen the error corrects relatively quickly.

Figure 8:
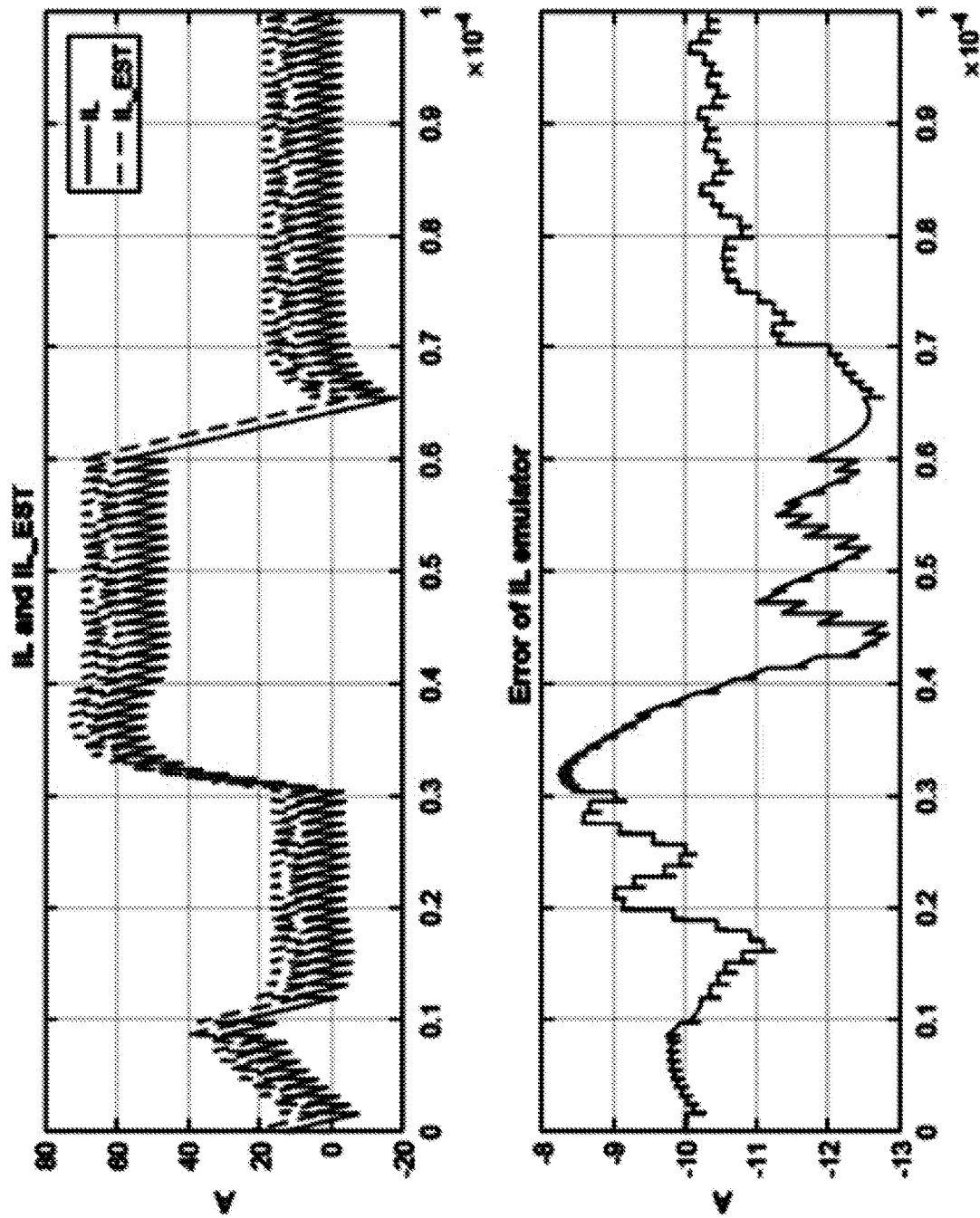
FIG. 8 illustrates corresponding results to FIG. 7 with initial error of 10 Amps, where the feedback loop is left open.
Figure 9:
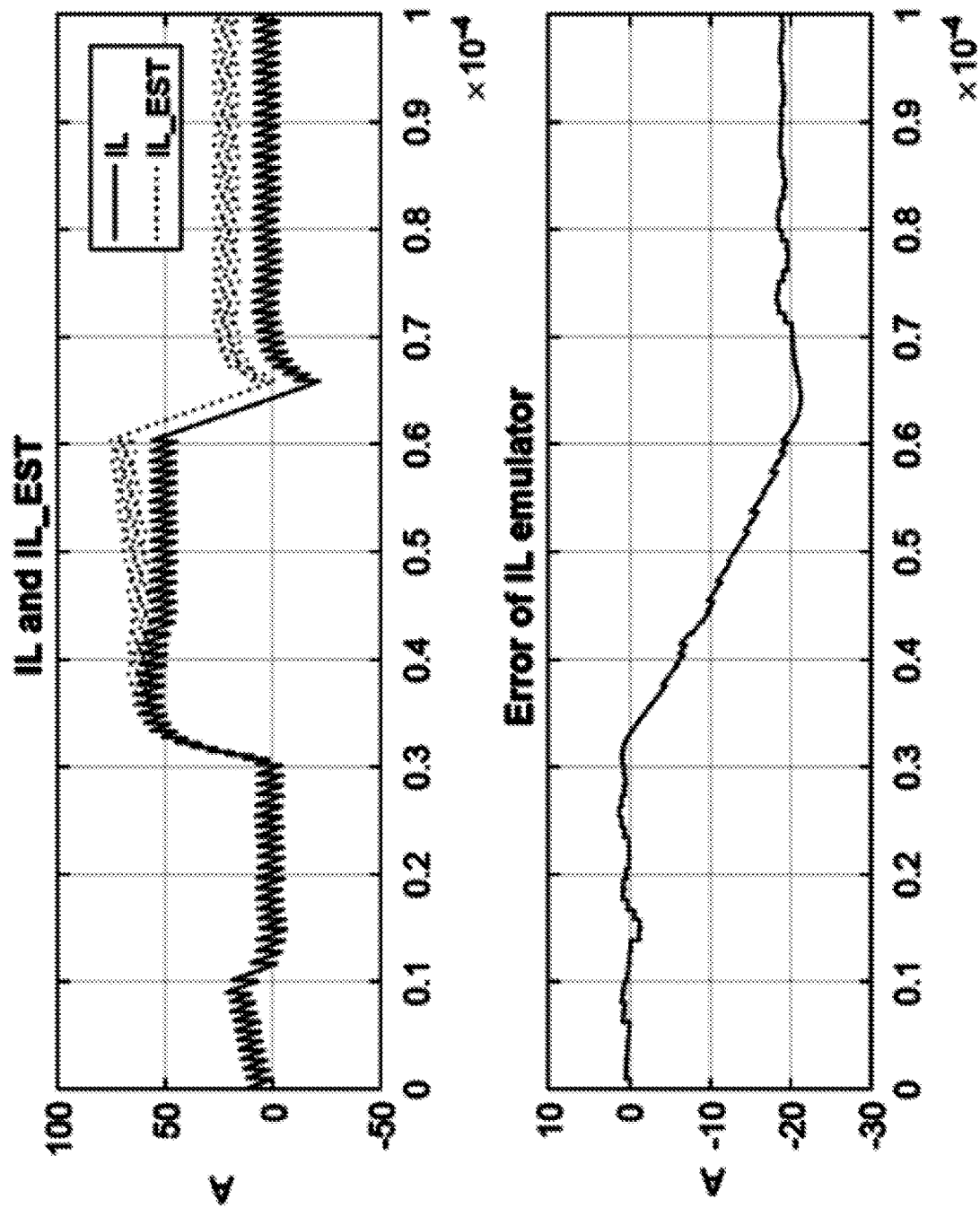
FIG. 9 Actual and estimated inductor current with DCR of 1.5 mΩ and the feedback loop is open.

In contrast, if as in FIG. 8, the closed loop is removed, there is no way to compensate these errors and the 10A initial current error is always present in the emulated waveform. When the load current increases, the I*R drop due to the DCR increases. In absence of any feedback loop, the estimated current will drift away from the actual inductor current, as shown in FIG. 9.

Figure 3:
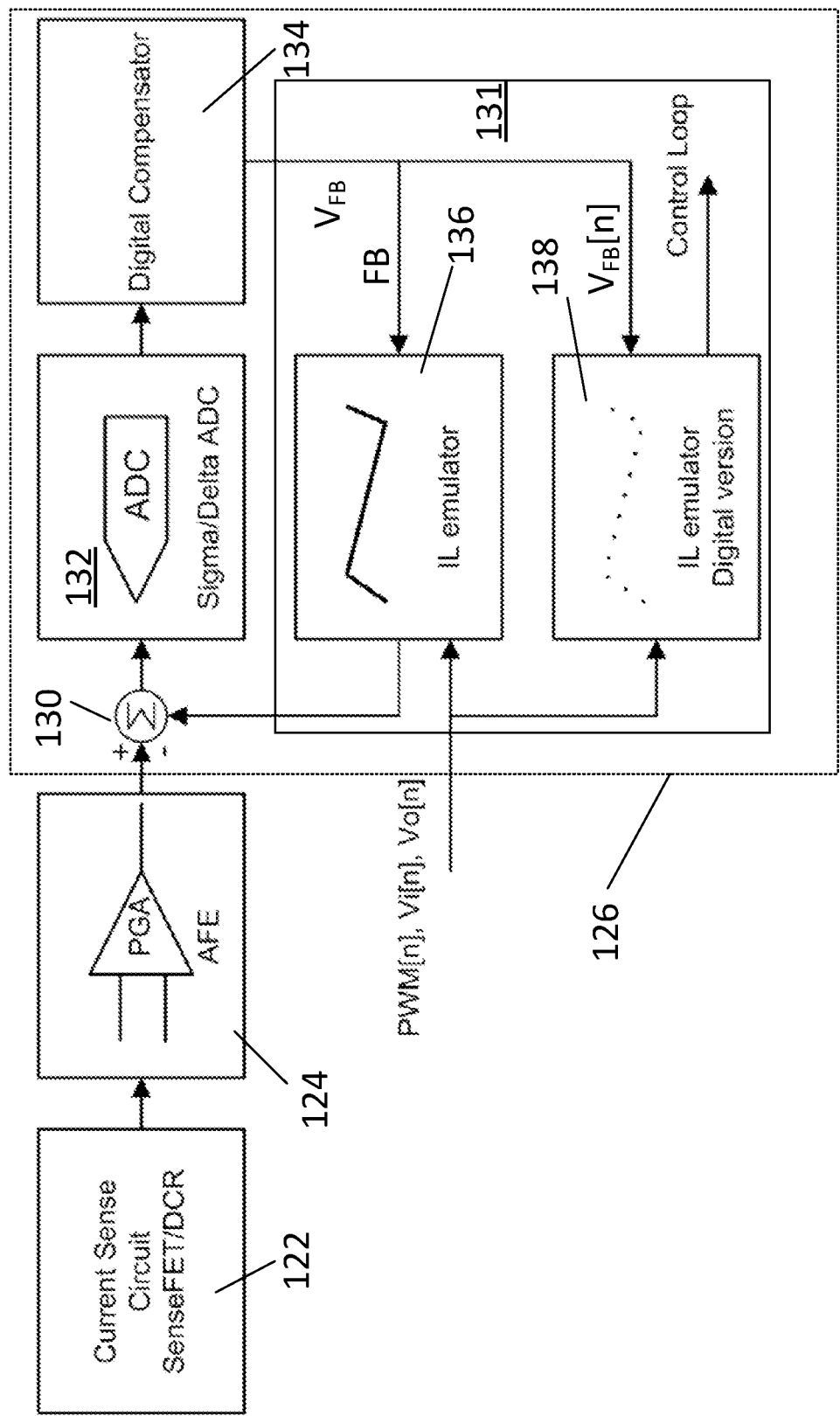
FIG. 3 is a block diagram of an arrangement for an inductor current emulator.
Figure 5A:
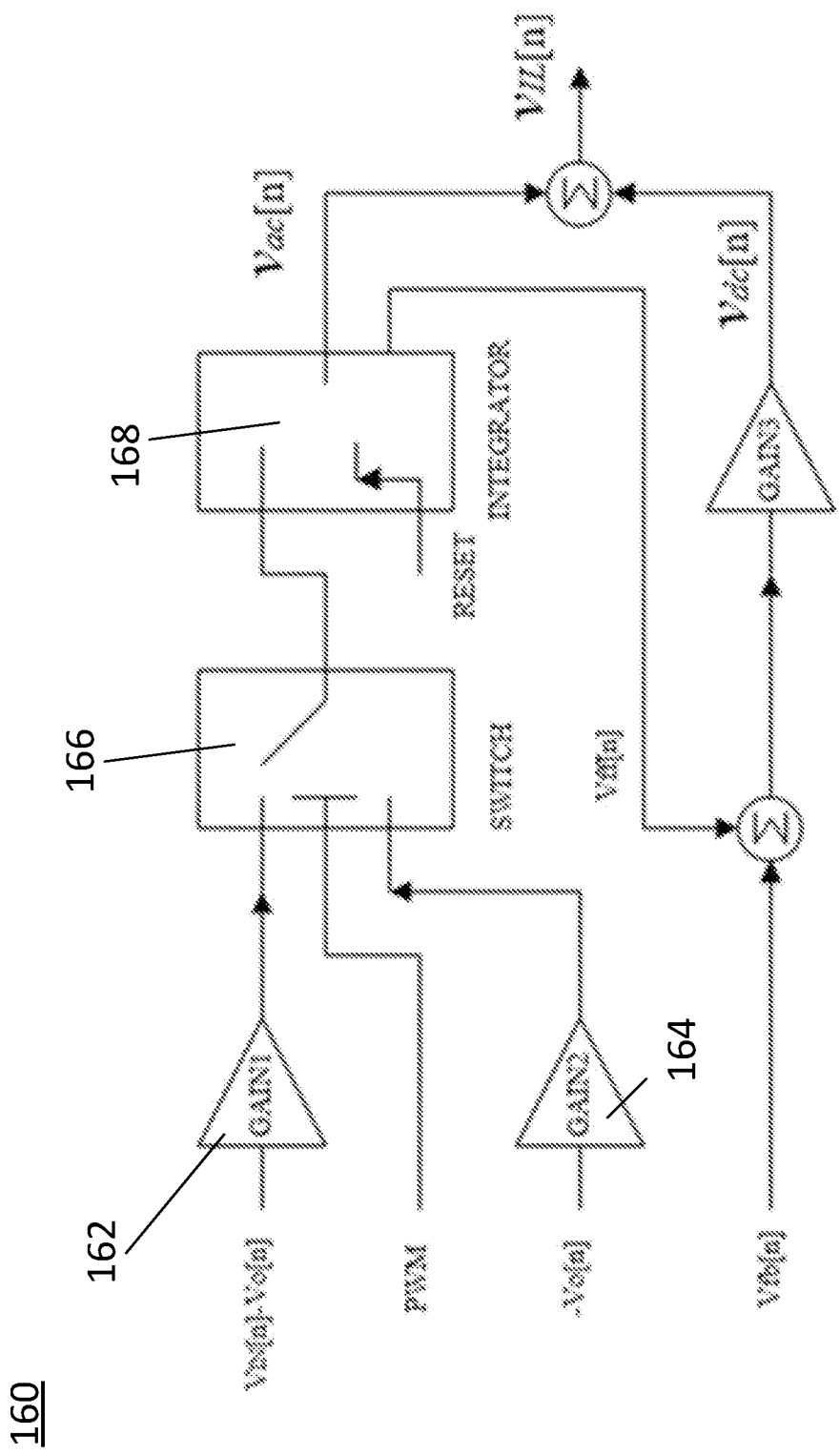
FIG. 5A is a block diagram of a digital replica of the inductor current emulator of FIG. 5 providing a digital form of emulated inductor current.

A corresponding digital inductor current emulator 160 as might be employed in FIG. 3, is shown in FIG. 5A, in which the various elements are employed to provide a digital emulated current value. In the digital inductor current emulator, a first gain 162 is applied to the signal $V_{IN}[n]-V_o[n]$. A second gain 164 is applied to the signal $-V_o[n]$. A switch 166 is employed to switchably connect the outputs from each of the respective gain elements to an integrator 168.

Thus the GAIN1 and GAIN2 values are representative of the value of inductor L, with the value Vfb[n] representing the value from the digital compensator following the sigma-delta ADC. The switch is responsive to the PWM signal and switches between the digital signals for $(V_{IN}-V_O)$GAIN1 and $-V_O$(GAIN2) and provides an digital form of the $V_{ac}$, namely $V_{ac}[n]$.

Auto Tuning of the Inductance

Although the proposed $I_L$ emulator method can tolerate the inductance value variation through the feedback loop operation, in some circumstances accurate inductance is required to get accurate inductor peak and valley current information.

In this context, it is well known that the inductance value of a power inductor may vary up to 20% of its rating value. Equally, it is also highly dependent on temperature and so a one-time calibration whilst useful is less effective than a method which is repeated periodically or continuously.

The present application provides for a continuous auto tuning of the inductance value based on the emulator approach described above.

As described above, the average emulated current should equal the average actual inductor current when the closed loop is regulated in steady state.

Figure 10:
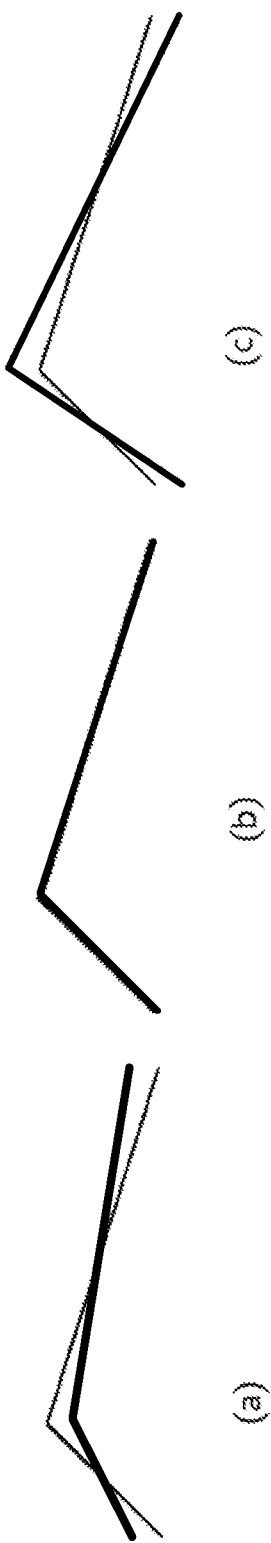
FIG. 10 The emulated inductor current (thicker trace) and the actual inductor current (thinner trace) in steady state with (a) the inductance setting is 20% bigger than the actual one; (b) the inductance setting is equal to the actual one; (c) the inductance setting is 20% less than the actual one.

FIG. 10 shows three cases of the emulated inductor current (represented by the thicker line) and the actual inductor current (represented by the thinner line). In the first case (a) the inductance setting is 20% bigger than the actual one. In the second case (b) the inductance setting is equal to the actual one. In the third case, (c) the inductance setting is 20% less than the actual one.

The target of the auto tuning loop is to arrive at the ideal emulated current, as in case (b), by adjusting the inductance used in the emulator. It will be appreciated that the emulator AC waveform, $v_{ac}$, is proportional to $L/C_1$. At the same time, the value of C1 is fixed by design and suitably calibrated.

Therefore, it will be appreciated that the inductance value may be determined by adjusting the $L/C_1$ coefficients, i.e. the current DACs that feed C1 are adjusted. Once, the AC waveforms match, the inductance is known.

Figure 11:
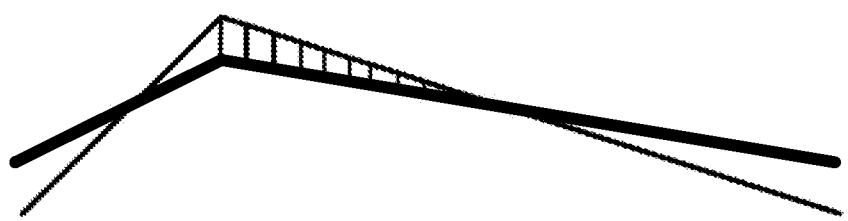
FIG. 11 represents the current error which is sensed by the Sigma Delta ADC of the emulator of the first aspect of the application.

When the inductance used in the emulator is not equal to the actual one, an error exists as shown the shadow region illustrated between the two lines in FIG. 11. This current error is sensed by the Sigma Delta ADC in the emulator loop, i.e. the input to the sigma delta converter represents the error. It will be appreciated that owing to the over sampling nature of a Sigma Delta ADC, multiple samples are captured and converted in this shadow region. From these samples, the area of this error region may be calculated by integrating the samples together.

Figure 12:
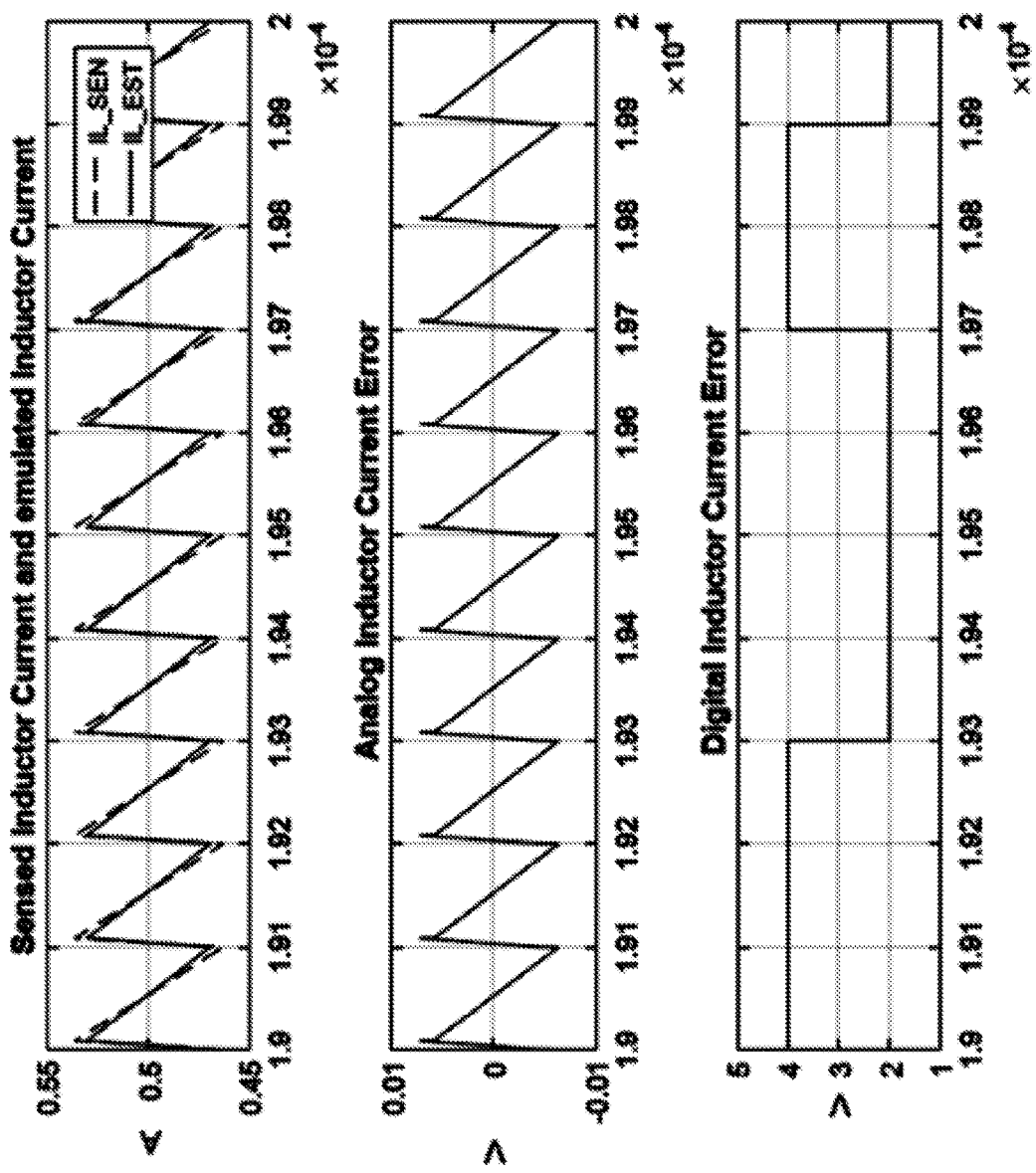
FIG. 12 represents waveforms when the inductance setting value is 20% higher than the actual inductance.
Figure 13:
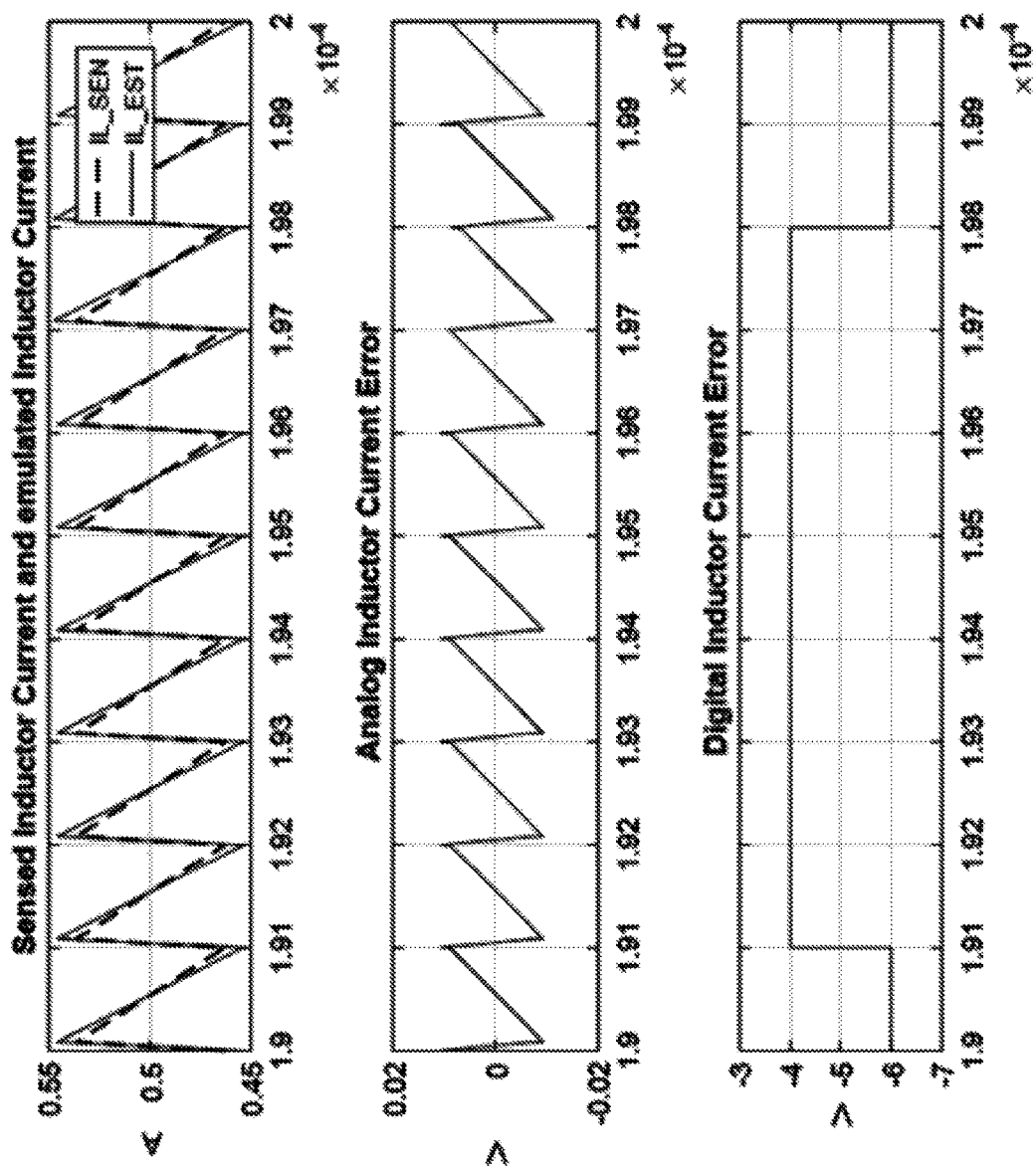
FIG. 13 represents waveforms when the inductance setting value is 20% less than the actual inductance.

Simulations are performed to illustrate the inductance tracking operation. FIG. 12 shows the waveforms when the inductance setting value is 20% higher than the actual inductance. From top to bottom are sensed inductor current and the emulated inductor current, their difference in analog format, the integrated error area in the first half of the off time. FIG. 13 shows the same waveforms when the inductance setting value is 20% higher than the actual one.

Figure 14:
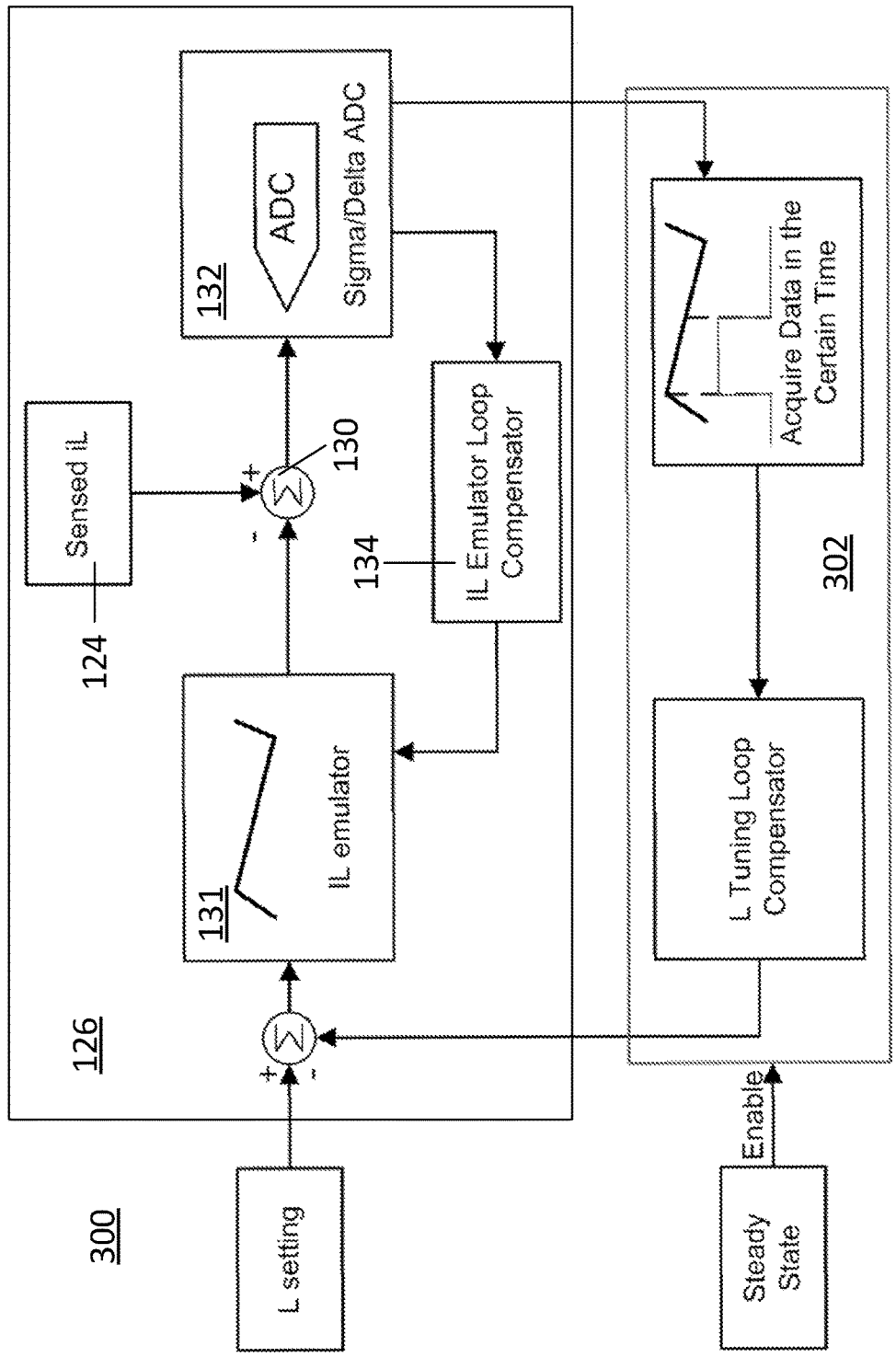
FIG. 14 is a block diagram of the $I_L$ emulator according to a second aspect of the application including an inductance auto tuning loop.

So now the control operation is designed to force the error area to zero by adjusting the inductance. FIG. 14 shows an arrangement 300 in which the value employed for inductance is tuned by an inductance auto tuning arrangement 302 for the IL emulator. The IL emulator now has two loops, namely an inner loop and an outer loop.

The inner loop is the IL emulator loop and employs elements as previously described and identified by common reference numerals. The inner loop forces the average value of the emulated inductor current equal to the average value of the sensed inductor current.

The outer loop is an auto tuning loop. It uses the existing over sampling ADC outputs in a certain time (for example, the first half of the PWM off time), then integrates them together to feed the tuning loop compensator. The tuning loop compensator in turn generates an output which is used to adjust the inductance value (Lsetting) employed in the emulator. To simplify the analysis, this auto tuning operation is only performed when the system works in steady state. The inner loop is fast with a bandwidth of about 100 kHz. While the outer loop is relative slow, its bandwidth can be lower than 1 kHz. This is reasonable because the inductance value varies very slowly, corresponding to temperature changes. The auto tuning loop may be realized in digital logic or code, making it is easy to design and implement.

Figure 15:
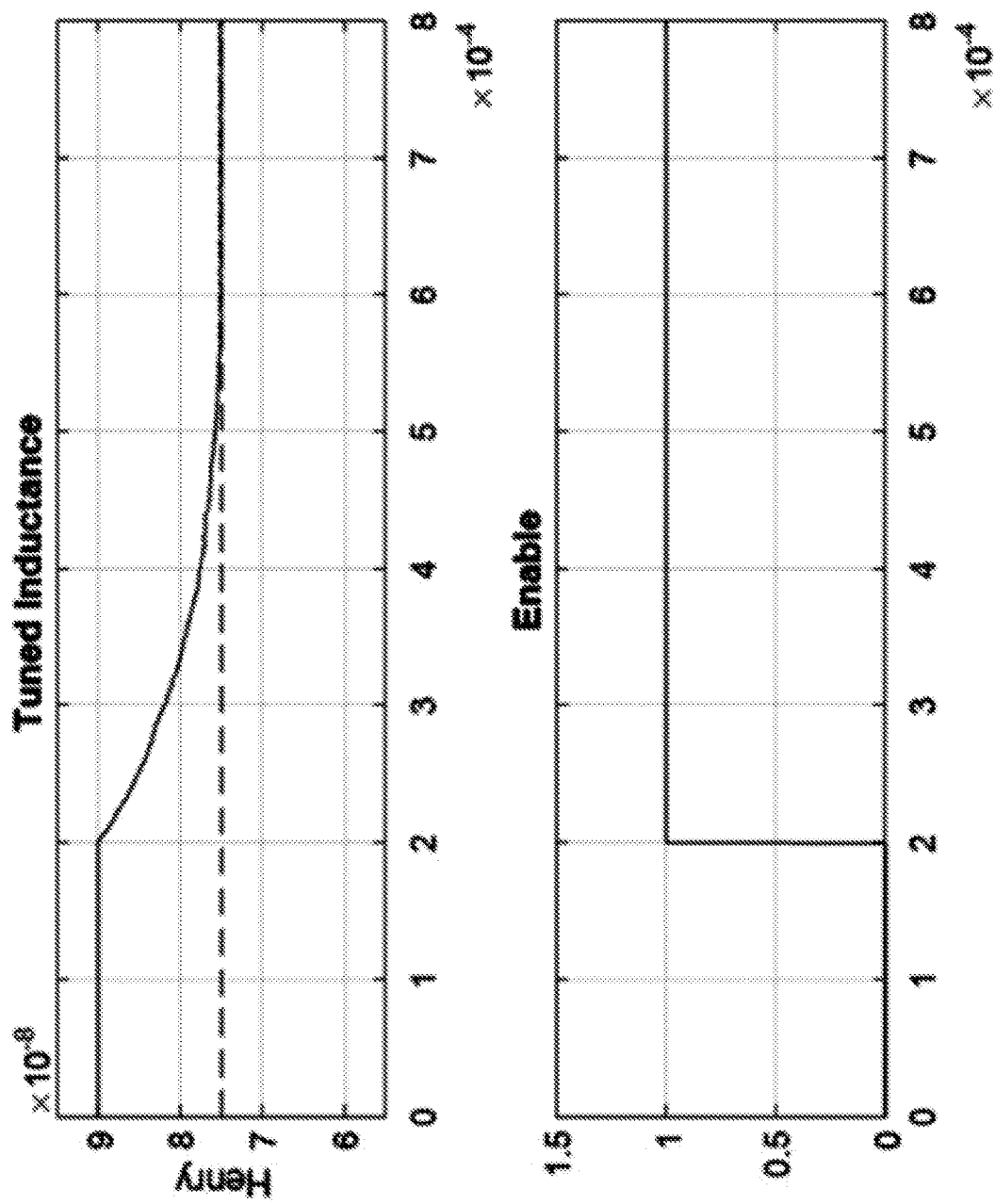
FIG. 15 Tuned inductance value with the initial inductance set 20% higher than the actual inductance.
Figure 16:
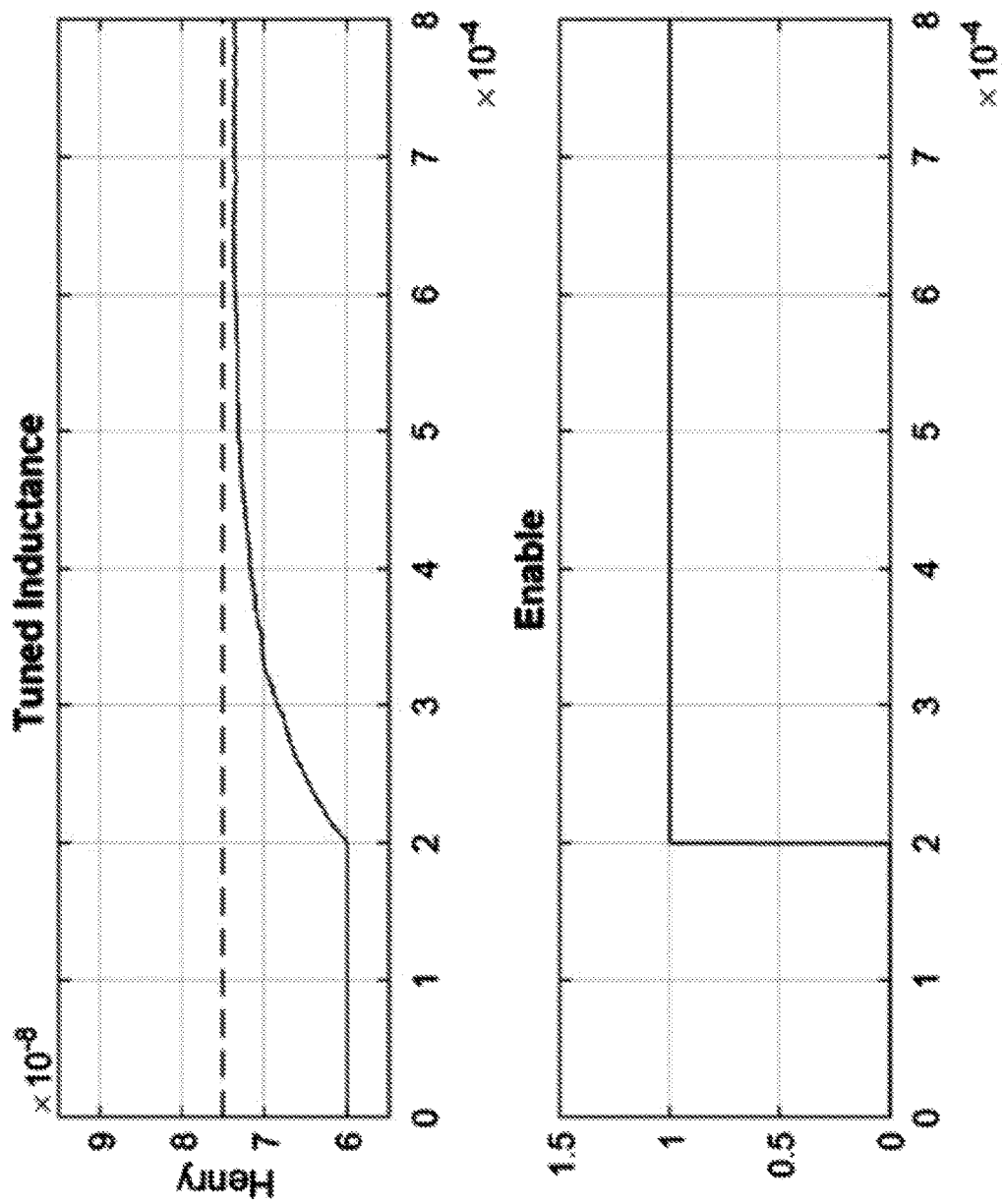
FIG. 16 Tuned inductance value with the initial inductance set to 20% less than the actual inductance.

Simulations are performed to demonstrate the auto tuning operation. The conditions employed were:
$V_{in}$: 12 V
$V_{out}$: 1 V
FSW=1 MHz
L Actual=75 nH
L initial=90 nH (FIG. 14), 60 nH (FIG. 15)
When the auto tuning loop is enabled, the inductance value is regulated the actual value (dashed line) in about 600 us.

The present application provides an inductor current emulator and method to estimate the inductor current in a converter, for example such as a buck converter. Compared to a conventional method with a high speed and high resolution ADC, the present application comprises an analog subtraction, a sigma/Delta ADC, a digital compensator and two DACs.

Figure 17:
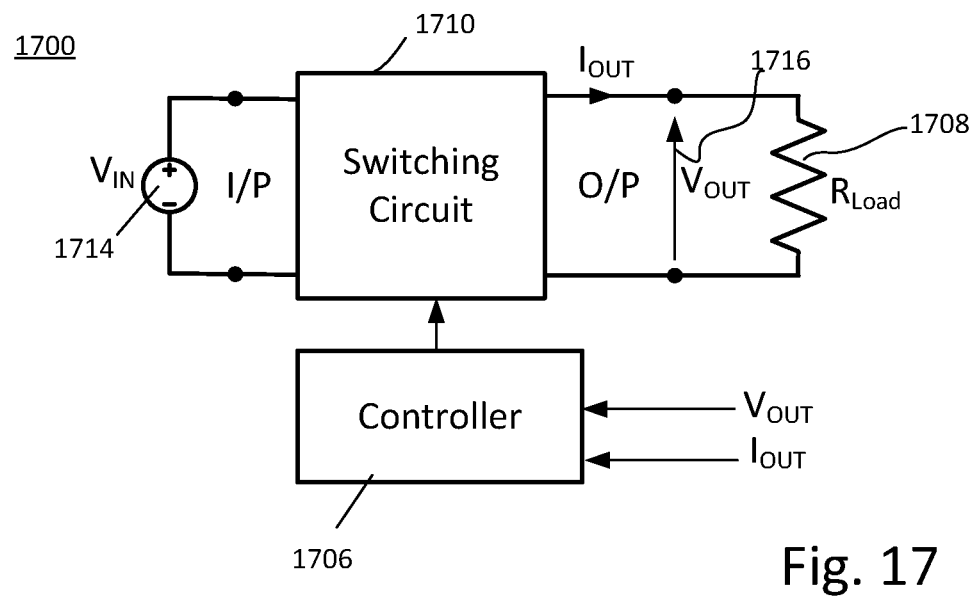
FIG. 17 depicts a power supply switching circuit.

The inductor current emulator may be employed within a controller 1706 of a power supply switching circuit, such as switching circuit 1700 of FIG. 17, to ensure the correct delivery of an output voltage through a switching circuit 1710 to a load 1708 from an input voltage 1714. The controller 1706 responds to measurements from the switching circuit, including the output voltage and output (inductor) current. It will be appreciated that whilst the inductor emulator has been explained in the context of the switching circuit 1710 being a buck converter, that it may equally be employed in a variety of different DC-DC switching topologies including for example but not limited to boost, flyback, SEPIC, buck-boost, Ćuk and Split-pi.

Figure 18:
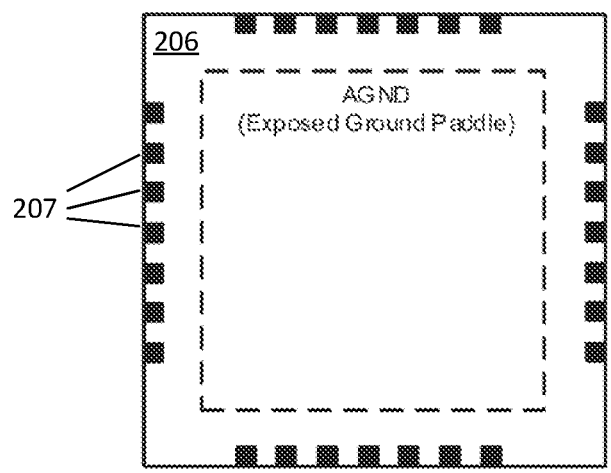
FIG. 18 depicts a controller.

A controller implementing the aforementioned current emulator may be provided in an appropriate integrated circuit package. As an example, a controller 206 is presented in FIG. 18 as a 32-Lead 5 mm×5 mm Quad Flat No-leads (QFN) package. The package comprises a plurality (32) of contacts 207 which are arranged in groups of 8 contacts on each of four edges of the package to which connections may be made from an underlying circuit board. A central area of the package (ground paddle) may be employed as a $33^{rd}$ contact to provide a ground connection. Individual ones of the contacts provide for specific measurements to be fed back from the switching circuit to the integrated circuit. Similarly, other contacts provide switching (PWM) signals for control of one or more switches in the switching circuit. Other contacts provide power to the integrated circuit and others may provide for connection to other devices and configuration of the controller.

It will be appreciated that these are relatively simple analog blocks and digital functions that can be designed with limited design effort by a person skilled in the art. Nonetheless, they offer a significant reduction in power consumption and silicon area required. Additionally, the emulator has better noise immunity because of its continuous time operation rather relying on fast sampling. With the addition of the inductance auto tuning, the emulator can track the actual inductance value, correcting for both initial error and drift due to temperature or other effects.

It will be appreciated that the various components of the circuits may be constructed in analog or digital form or a combination of the two. Although the present application has been described in relation to particular embodiments thereof, many other variations and modifications and other uses will become apparent to those skilled in the art. It is preferred, therefore, that the present application be limited not by the specific disclosure herein, but only by the appended claims.

The invention claimed is:

1. An inductor current emulator circuit for use in a current mode controller using pulse width modulation to control a switching power supply to provide an output voltage and an output current from an input voltage, the inductor current emulator circuit comprising:
a comparator having a first input for receiving a sensed inductor current value and a second input, the comparator providing an output representing the difference between the first and second inputs;
an analog to digital converter for converting the output of the comparator to a digital signal;
a digital compensator responsive to the digital signal to provide a compensated digital signal representative of a DC component of inductor current; and
an analog emulator receiving the compensated digital signal representative of the DC component of inductor current and providing an emulated value of current to the second input of the comparator.

2. An inductor current emulator according to claim 1, wherein the analog to digital converter is a sigma delta analog to digital converter.

3. An inductor current emulator according to claim 1, wherein the analog emulator comprises an AC emulator circuit configured to generate an emulated AC component of inductor current.

4. An inductor current emulator according to claim 3, wherein the analog emulator is configured to add the emulated AC component of inductor current to the DC component of inductor current to provide the emulated value of current to the second input of the comparator.

5. An inductor current emulator according to claim 4, wherein the analog emulator comprises a first Digital to Analog converter for converting the digital signal representative of the DC component to an equivalent analog value which is added to the emulated AC component of inductor current to provide the emulated value of current to the second input of the comparator.

6. An inductor current emulator according to claim 5, wherein the AC emulator circuit comprises a capacitor for storing the instantaneous value of the AC component of inductor current.

7. An inductor current emulator according to claim 6, wherein the AC emulator circuit comprises a second DAC providing a current to charge the capacitor during the ON time of a pulse width modulation (PWM) switching cycle.

8. An inductor current emulator according to claim 7, wherein the second DAC converts a digital signal representative of the difference between $V_{IN}$ and $V_{OUT}$ for the switching converter divided by a value representative of the inductance of the inductor.

9. An inductor current emulator according to claim 6, wherein the AC emulator circuit comprises a third DAC providing a current to discharge the capacitor during the OFF time of a pulse width modulation (PWM) switching cycle.

10. An inductor current emulator according to claim 9, wherein the third DAC converts a digital signal representative of $V_{OUT}$ for the switching converter divided by a value representative of the inductance of the inductor.

11. An inductor current emulator according to claim 6, further comprising a reset circuit for resetting the capacitor at the start of pulse width modulation (PWM) switching cycles of the converter.

12. An inductor current emulator according to claim 11, further comprising a digital emulator operating in parallel with the analog emulator to provide a digital emulated inductor current, wherein the AC component of the digital emulator at the time the reset circuit resets the capacitor is fed forward from the digital emulator to modify the digital signal representative of the DC component of inductor current.

13. An inductor current emulator according to claim 1, further comprising a digital emulator operating in parallel with the analog emulator to provide a digital emulated inductor current.

14. An inductor current emulator according to claim 13, further comprising an inductance adjusting loop for adjusting an inductance value employed by the inductor current emulator.

15. An inductor current emulator according to claim 14, wherein the inductance adjusting loop is responsive to the output from the analog to digital converter.

16. A controller for the switching circuit of a power supply, the controller comprising the inductor current emulator according to claim 1.

17. A power supply comprising a switching circuit and a controller according to claim 16 for controlling the switching circuit.

18. A power supply according to claim 17, wherein the power supply is a DC-DC converter.

19. A power supply according to claim 18, wherein the DC-DC converter is a buck converter.

20. A power supply according to claim 18, wherein the DC-DC converter is a boost converter.

21. An integrated circuit comprising the controller of claim 16.

22. A circuit for adjusting a value of inductance of an inductor employed in a switching circuit controller, the circuit comprising:
a first circuit providing a sensed current waveform of current in the inductor;
a second circuit providing an emulated current waveform of current in the inductor, wherein the second circuit employs the inductance value in providing the emulated current waveform and wherein the circuit is responsive to an error value representative of the difference between the waveforms of the first and second waveforms to adjust the inductance value to minimize the error value.

23. An inductor current emulator circuit for use in a current mode controller using pulse width modulation to control a switching power supply comprising a switching circuit with an inductor, the switching circuit providing an output voltage and an output current from an input voltage, the inductor current emulator comprising:
an analog inductor current emulator comprising an analog circuit for emulating the current in the inductor of the switching circuit and providing an emulated analog output of inductor current;
a digital inductor current emulator comprising a digital circuit for emulating the current in the inductor of the switching circuit and providing an emulated digital output of inductor current.

* * * * *